United States Patent [19]

Itoh et al.

[11] Patent Number: 5,709,098

[45] Date of Patent: Jan. 20, 1998

[54] AIR CONDITIONING APPARATUS

[75] Inventors: Satoshi Itoh, Kariya; Kunio Iritani, Anjo; Takahisa Suzuki, Kariya; Yuji Takeo, Toyoake, all of Japan

[73] Assignee: Nippondenso Co., Ltd., Kariya, Japan

[21] Appl. No.: 658,643

[22] Filed: Jun. 5, 1996

[30] Foreign Application Priority Data

Jun. 6, 1995 [JP] Japan ................................ 7-139705

[51] Int. Cl.$^6$ .............................. F25B 49/02; B60H 1/00
[52] U.S. Cl. ........................... 62/228.4; 62/229; 62/230
[58] Field of Search ........................ 62/230, 228.4, 62/229, 244, 160, 208, 209, 228.1, 228.5

[56] References Cited

U.S. PATENT DOCUMENTS 4,735,058  4/1988  Umezu et al. .................. 62/230 X
4,736,595  4/1988  Kato ......................... 62/228.4 X
5,537,831  7/1996  Isaji et al. .................. 62/228.4

*Primary Examiner*—Harry B. Tanner
*Attorney, Agent, or Firm*—Harness, Dickey & Pierce, PLC

[57] ABSTRACT

In the cooling operation, it is determined whether supplied electric current (IDC) supplied to an electric motor for driving a compressor is less than a predetermined value or not, that is, whether consumed electric power of the electric motor is less than a predetermined value or not. In the cool-down control, the determination may be "NO", however, in this case an inverter is controlled so that the IDC is set to the predetermined value. Thus, in the present invention, since IDC is always the predetermined value a1 or less and the consumed electric power of the electric motor is always the predetermined value or less, coefficiency of performance (COP) of the refrigerating cycle can be maintained to a predetermined magnitude.

30 Claims, 10 Drawing Sheets

| Δf (rpm/4sec) | | En | | | | |
|---|---|---|---|---|---|---|
| | | NB | NS | ZO | PS | PB |
| Edot | NB | | | 200 | | |
| | NS | | 80 | 150 | | |
| | ZO | 200 | 100 | 0 | -100 | -200 |
| | PS | 100 | -50 | -80 | -150 | |
| | PB | -50 | -100 | -150 | -200 | |

AIR CONDITIONING APPARATUS

CROSS REFERENCE TO RELATED APPLICATION

This application is based on and claims priority of Japanese Patent Application No. Hei. 7-139705 filed on Jun. 6, 1995, the content of which is incorporated herein by reference.

BACKGROUND OF THE INVENTION

1. Field of the Invention

The present invention relates to an air conditioning apparatus, which controls air temperature blown into a passenger compartment controlling the rotational speed of a compressor of a refrigerant cycle according to a target temperature set by temperature setting means and an actual air conditioning load.

2. Description of Related Art

The above air conditioning apparatus is applied to electric vehicles, for example. In this air conditioning apparatus for electric vehicles, a compressor of a refrigerating cycle is actuated by an electric motor. By adjusting the amount of electric current supplied to the electric motor and the rotational speed of the electric motor, cooling capacity or heating capacity in an evaporator or condenser disposed in an air conditioning duct is regulated to control the temperature of the conditioned air blown into a passenger compartment.

According to this air conditioning apparatus, when rapid cooling control (hereinafter referred to as "cool-down control") or rapid heating control (hereinafter referred to as "warm-up control") is performed to control the temperature in the passenger compartment, deviation between the target temperature set by temperature setting means and the actual temperature in the passenger compartment is large at initial time. In such a case, to cool or heat the passenger compartment quickly, almost the maximum amount of electricity is supplied to the electric motor to control the rotational speed of the compressor at almost the maximum rotational speed.

If the rotational speed of the compressor increases, cooling capacity or heating capacity also improves, however, the higher the rotational speed of the compressor becomes, the fewer the degree of improvement becomes. That is, the cooling capacity or heating capacity with respect to a work (in this case it means consumed electric power of the electric motor) of the compressor, i.e., coefficiency of performance (hereinafter referred to as "COP") of the refrigerant cycle, becomes smaller, the higher (the larger consumed electric power of the electric motor becomes) the rotational speed of the compressor becomes, as shown in FIG. 15.

Thus in the conventional air conditioning apparatus, the compressor is rotated with a high rotational speed more than necessity to rapidly cool or heat the passenger compartment in the cool-down control or the warm-up control, which causes a problem of deteriorating the operation efficiency of the refrigerant cycle.

SUMMARY OF THE INVENTION

In light of the above-described problem, the present invention has an object to improve the operation efficiency of the refrigerant cycle in the cool-down control or warm-up control as much as possible in an air conditioning apparatus for adjusting the temperature of conditioned air blown into the passenger compartment by controlling the rotational speed of the compressor of the refrigerant cycle according to the target temperature set by the temperature setting means and the actual air conditioning load.

According to the present invention, the target rotational speed determining means determines target rotational speed in accordance with the target temperature set by the temperature setting means and actual air conditioning load, and the driving control means controls the driving means of the compressor in such a manner that actual rotational speed of the compressor is set to the target rotational speed or less. Thus, cooling capacity or heating capacity in the evaporator or the condenser in the air passage can be controlled so that the air temperature blown into the compartment is set to the predetermined temperature.

Therefore, for example, at the initial time of cool-down control when actual temperature in the car compartment is very high compared with the target temperature or at the initial time of warm-up control when actual temperature in the car interior is very low compared with the target temperature, fairly high rotational speed is determined as the target rotational speed, and the actual rotational speed of the compressor is controlled at fairly high rotational speed. As a result, rapid cooling or rapid heating in the compartment is performed.

By the way, if the target rotational speed is determined according to the target temperature set by the temperature setting means as mentioned above and actual air conditioning load so that the actual rotational speed of the compressor can be the target rotational speed when a physical value relative to consumed electric power of the driving means is larger than a predetermined value, a predetermined size of coefficiency of performance (COP) of the refrigerant cycle cannot be obtained.

In the present invention, means for obtaining a physical value relative to consumed electric power of the driving means and determining means for determining whether the physical value is larger or smaller than the predetermined value. When the determining means determines the physical value is larger than the predetermined value, the target rotational speed determining means determines the target rotational speed so that the actual physical value is set to the predetermined value or less.

Therefore in this case, since the driving control means controls the rotational speed of the compressor so that the actual physical value is set to the predetermined value or, the predetermined size of the COP of the refrigerant cycle can be obtained, and the rotational speed of the compressor can be maintained to secure the predetermined capacity of cooling capacity or heating capacity.

In this way, the present invention can obtain the predetermined size of the COP of the refrigerant cycle, even if difference between the target temperature set by the temperature setting means and the actual air conditioning load is large as in the case of initial time of cool-down control or warm-up control. In addition, operation efficiency of the refrigerant cycle can be improved while securing the predetermined cooling capacity or heating capacity.

Further, in view of the variation in the cooling capacity of the evaporator or heating capacity of the condenser varies according to air temperature at the suction side of the evaporator or the condenser in the air passage. By detecting air temperature at the suction side by the suction temperature detecting means, the predetermined value may be determined based on this detected temperature.

The predetermined value may be determined as a predetermined size of the COP of the refrigerant cycle, or as a changing rate of the COP of the refrigerant cycle.

Thus, no matter what temperature the suction temperature is, the predetermined size of the COP of the refrigerant cycle can be obtained and also predetermined capacity of cooling capacity or heating capacity can be surely maintained.

A heat pump type refrigerant cycle where the evaporator and the condenser are disposed in the air passage may be employed. Therefore, in the cooling, the evaporator cools the air in the air passage for cooling the compartment, while in the heating, the condenser heats the air in the air passage for heating the compartment. In the present invention, in both the cool-down control and warm-up control, the predetermined size of the COP of the refrigerant cycle can be surely maintained and the predetermined capacity of cooling capacity and heating capacity can be also obtained.

The air conditioning apparatus according to the present invention may be applied to an electric vehicle. Since the operation efficiency of the refrigerant cycle can be improved as described above and the electric motor can save consumed electic power, consumed electric power of the electric vehicle as a whole can be also saved, as a result, a running mileage by one charge is prolonged, for example.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Next, a first embodiment in which the present invention is applied to an air conditioning apparatus for an electric vehicle is described below with reference to FIGS. 1 to 10.

Figure 1:
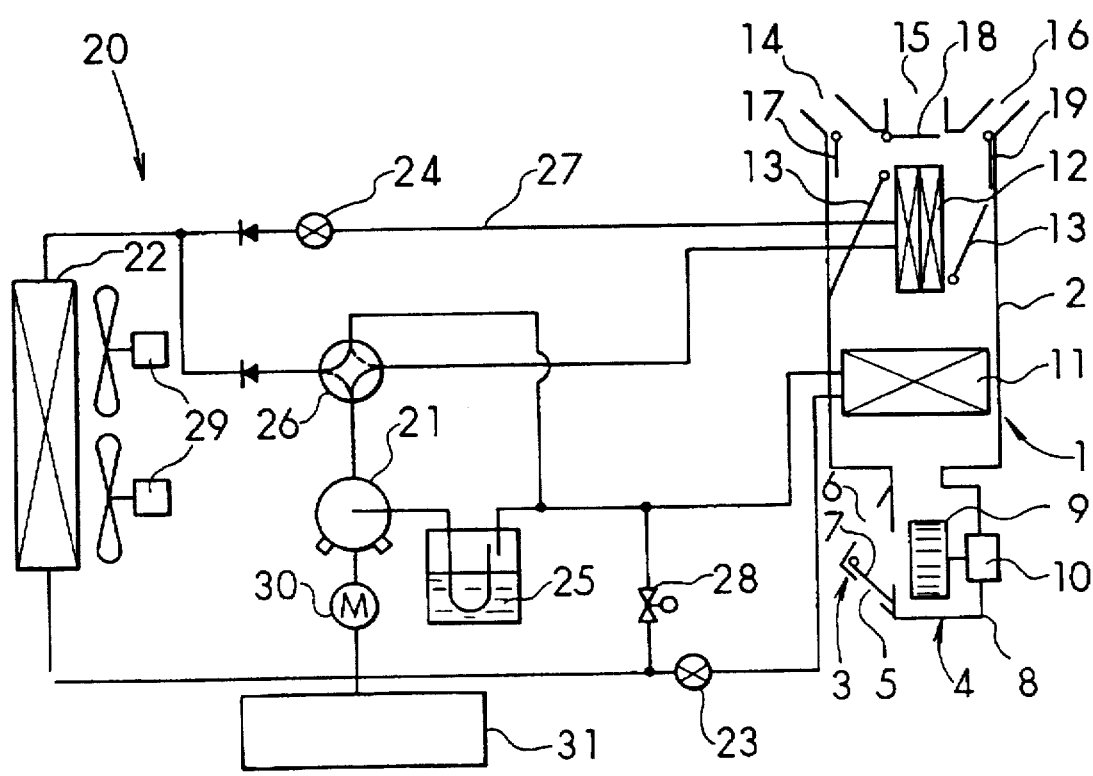
FIG. 1 is a view of an entire structure of a first embodiment of the present invention.

An air conditioning duct 2 in an air conditioning unit 1 shown in FIG. 1 forms an air passage therein to introduce the air into the passenger compartment of the vehicle. At one end of the air passage, an inside/outside air switching means 3 and a blower means 4 are disposed while at the other end, plural air outlets 14–16 leading to passenger compartment are formed.

The inside/outside air switching means 3 includes an inside/outside air switching case where an inside air inlet 5 for sucking the air in the passenger compartment (inside air) and an outside air inlet 6 for sucking the fresh air outside the vehicle (outside air) are formed, and an inside/outside air switching damper 7 disposed in inside/outside air switching case for selectively opening and closing each air inlet 5 or 6. This inside/outside air switching damper 7 is driven by its driving means (not shown, for example, a servo motor).

The above-described blower means 4 generates air flow in the air conditioning duct 2 from the inside air inlet 5 or the outside air inlet 6 toward each of the air outlets 14 to 16. More specifically, a multi-vane fan 9 disposed in a scroll casing 8 is driven by a motor 10 as its driving means.

Also, an indoor cooling heat exchanger 11 is disposed at the air downstream side of the fan 9 in the air conditioning duct 2. This indoor cooling heat exchanger 11, which is a heat exchanger for forming a part of a refrigerating cycle 20 described later, functions as an evaporator to dehumidify and cool the air in the air conditioning duct 2 by the evaporating action of refrigerant passing therein in a cooling operation mode described later. However, in a heating operation mode described later, the refrigerant does not flow through indoor cooling heat exchanger 11.

An indoor heating heat exchanger 12 is disposed at the air downstream side of the indoor cooling heat exchanger 11 in the air conditioning duct 2. This indoor heating heat exchanger 12, which is a heat exchanger for forming a part of the refrigerant cycle 20, functions as a condenser to heat the air in the air conditioning duct 2 by condensing action of the refrigerant passing therein in the heating operation mode described later. However, in the cooling operation mode described later, the refrigerant does not flow through the indoor heating heat exchanger 12.

In addition, at a position adjacent to the indoor heating heat exchanger 12 in the air conditioning duct 2, an air mix door 13 is disposed for adjusting the amount of the air supplied from the fan 9 and flowing toward the indoor heating heat exchanger 12 and the bypass amount of the air supplied from the fan 9 and flowing so as to bypass the indoor heating heat exchanger 12.

As for the air outlets 14 to 16 described above, more specifically, there is a defroster air outlet 14 for blowing out the conditioned air to the inside surface of the windshield glass, a face air outlet 15 for blowing out the conditioned air toward the upper half of the body of a passenger in the passenger compartment, and a foot outlet 16 for blowing the conditioned air toward the lower half of the body of the passenger in the passenger compartment. At the air upstream side of these air outlets, doors 17 to 19 for opening and closing these air outlets 17 to 19 are disposed, respectively.

The above refrigerating cycle 20 is a heat pump type refrigerating cycle in which the inside of the passenger compartment is cooled or heated by the indoor cooling heat exchanger 11 and the indoor heating heat exchanger 12. In addition to these heat exchangers 11 and 12, the refrigerating cycle 20 includes a refrigerant compressor 21, an outside heat exchanger 22, a pressure reducing unit 23 for cooling, a pressure reducing unit 24 for heating, an accumulator 25, and a four-way valve 26 for switching the flow of the refrigerant, all of which are connected with a refrigerant pipe 27. In FIG. 1, an electromagnetic valve 28 is disposed to control the flow of the refrigerant, and an outdoor fan 29 is disposed to blow out air toward the outdoor heat exchanger 22.

By the way, the refrigerant compressor 21 sucks, compresses, and discharges the refrigerant when driven by an electric motor 30. This electric motor 30 is disposed in a sealed-up case integrally with the refrigerant compressor 21, and its rotational speed continuously varies based on control of an inverter 31. The electric current supplied to the inverter 31 is controlled by an electronic control unit (ECU) 40 (FIG. 2).

Figure 2:
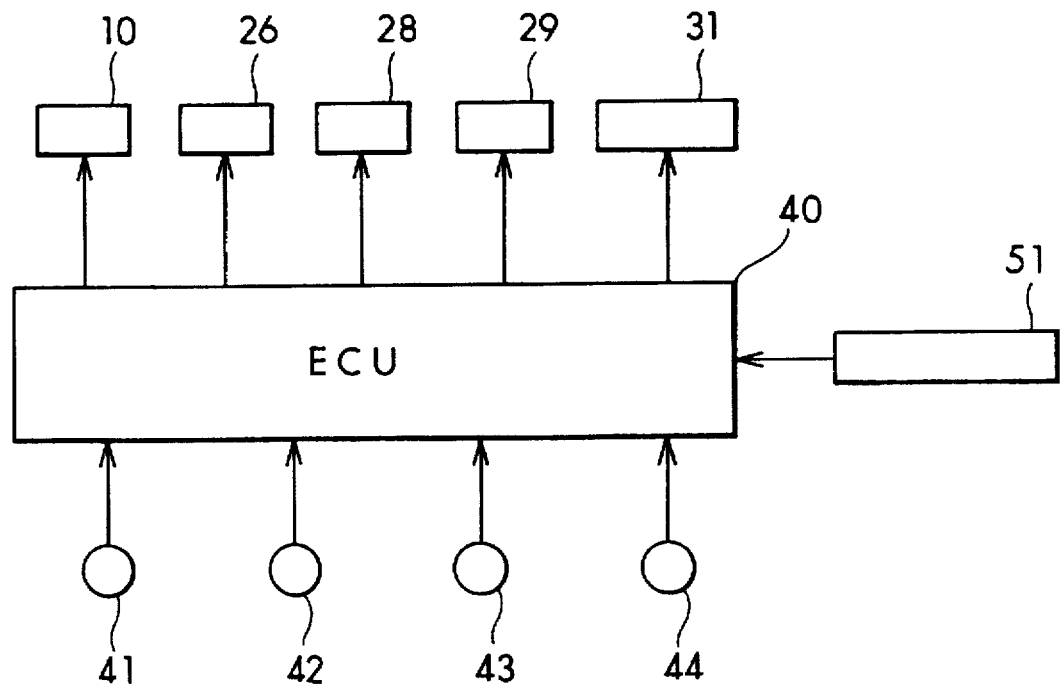
FIG. 2 is a block diagram of a control system of the above first embodiment.

As shown in FIG. 2, signals from an air temperature sensor 41 for detecting air cooling degree (more specifically, air temperature immediately after passing through the heat exchanger 11) in the indoor cooling heat exchanger 11, a compressor rotational speed sensor 42 for detecting rotational speed of the compressor 21, an electric current sensor 43 for detecting electric current input to the inverter 31, a high pressure sensor 44 for detecting high pressure at a discharge side of the compressor 21 as well as signals from each lever and switch of a control panel 51 disposed at the front side of the passenger compartment are input to the ECU 40, respectively.

Figure 3:
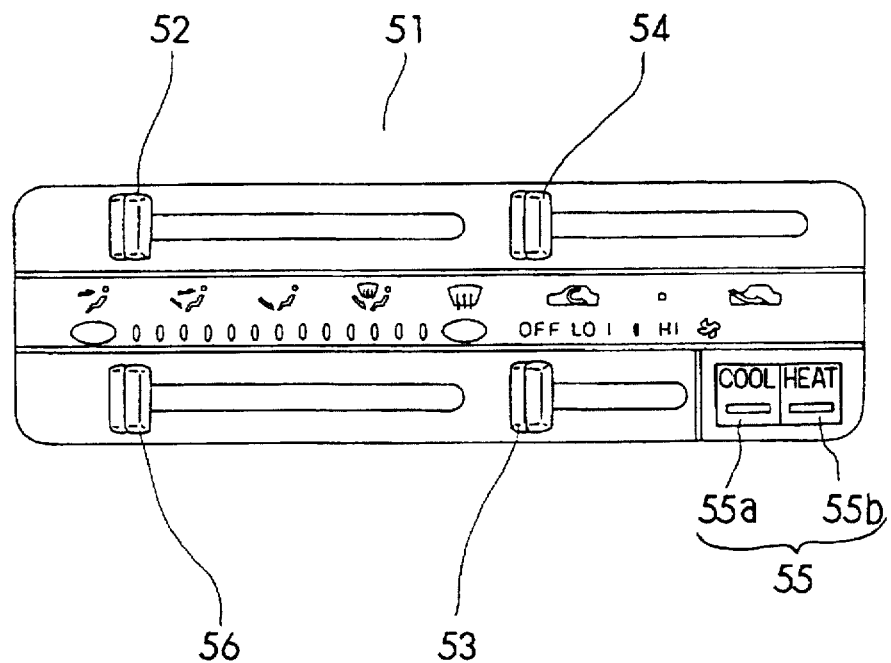
FIG. 3 is a front view of a control panel of the above first embodiment.

As shown in FIG. 3, this control panel 51 is equipped with a blow mode setting lever 52 for setting each blow mode, an air amount setting lever 53 for setting the amount of the air blown into the passenger compartment, an inside/outside air switching lever 54 for setting an inside/outside air switching mode, a cooling/heating mode setting switch 55 including a cooling operation switch 55a for setting the refrigerating cycle 20 to the cooling operation mode and a heating operation switch 55b for setting it to the heating operation mode, and a temperature setting lever 56 for adjusting the temperature of air blown into the passenger compartment.

Within ECU 40 in FIG. 2 is provided a microcomputer (not shown) which include CPU, ROM, RAM, and the like. The signals from the above respective sensors 41 to 44 and each signal from the control panel 51 are input to the microcomputer through an input circuit (now shown) within the ECU 40. These microcomputer executes a predetermined process described later and controls the above respective driving means such as the inverter 31 or the like based on the results of the execution. When a key switch of the vehicle (not shown) is turned on, electric power is supplied from a battery (not shown) to ECU 40.

By the way, when cooling operation switch 55a is turned on by the passenger, the ECU 40 controls the four-way valve 26 and the electromagnetic valve 28 in such a manner that the refrigerating cycle 20 is set to the cooling operation mode. In the cooling operation mode, the refrigerant flows through compressor 21, outdoor heat exchanger 22, pressure reducing unit 23 for cooling, indoor cooling heat exchanger 11, accumulator 25, and compressor 21 in this order.

On the other hand, when heating operation switch 55b is turned on by the passenger, the ECU 40 controls the four-way valve 26 and the electromagnetic valve 28 in such a manner that the refrigerating cycle 20 is set to the heating operation mode. In the heating operation mode, the refrigerant flows through compressor 21, the indoor heating heat exchanger 12, the pressure reducing unit 24 for heating, the outdoor heat exchanger 22, the electromagnetic valve 28, the accumulator 25, and the compressor 21 in this order.

Next, the control process of the inverter 31 performed by the microcomputers is described with reference to FIG. 4.

Firstly, when the key switch is turned on, electric power is supplied to the ECU 40. Further, when the air amount setting lever 53 is set at a position for a predetermined air amount other than "OFF", the routine in FIG. 4 starts and initialization and primary setting are respectively performed at the step 110. At the next step 120, signals from the above respective sensors 41 to 44 as well as from each lever and switch on the control panel 51 are input.

Then, at the next step 130, it is determined whether the cooling operation switch 55a of the control panel 51 is turned on or not. When the determination is ON at this step 130, it is determined whether supplied electric current IDC to the inverter 31 detected by the electric current sensor 43 is less than a first predetermined value a1 (10 A in this embodiment) or not at the next step 140.

Here, since consumed electric power PW of the compressor is expressed as the following equation (1), it is determined whether the PW is less than predetermined electric power or not at this step 140. The electric power means a electric power when COP of the refrigerating cycle 20 is equal to a predetermined value or more and cooling capacity is also equal to a predetermined value or more.

$$PW = (IDC) \times (\text{battery voltage}) \times (\text{inverter efficiency}) \quad (1)$$

Figure 5:
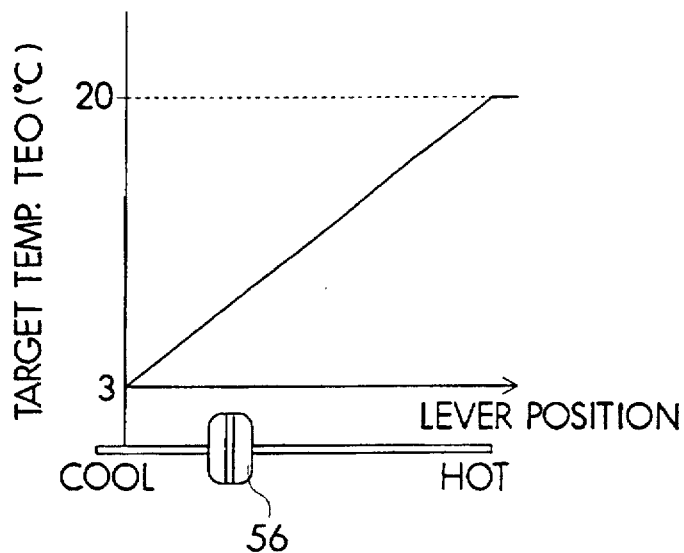
FIG. 5 is a graph showing the relation between a temperature setting lever and target temperature TEO of the above first embodiment.

When IDC is determined to be less than the first predetermined value a1 at this step 140, that is, the consumed electric power of the compressor is less than the above-described predetermined electric power, target temperature TEO of the air immediately after passing through the indoor cooling heat exchanger 11 is determined at the next step 150 according to the position of the temperature setting lever 56 of the control panel 51 based on the characteristics of FIG. 5 stored in ROM.

At the next step 160, deviation En between the above target temperature TEO and the actual air temperature TE detected by the air temperature sensor 41 is calculated based on the following equation (2).

$$En = TEO - TE \quad (2)$$

At the next step 170, deviation changing rate Edot is calculated based on the following equation (3).

$$Edot = En - En - 1 \quad (3)$$

Here, as the above-specified En is renewed every four seconds, En−1 is the previous value of En at four seconds before.

Figure 6A:
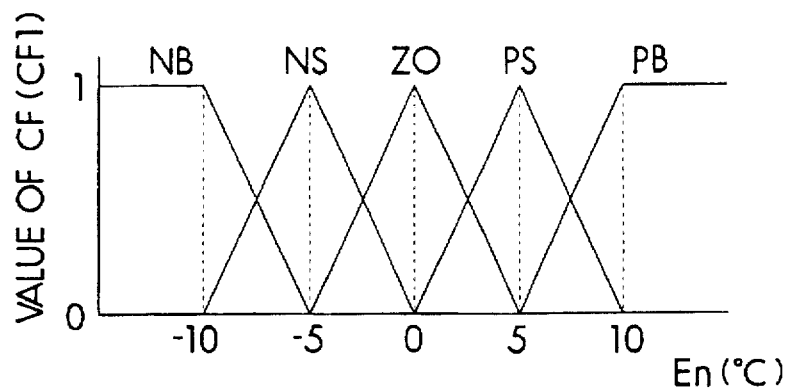
FIGS. 6A and 6B are membership functions to obtain target rotational speed of a compressor of the above first embodiment.
Figure 6B:
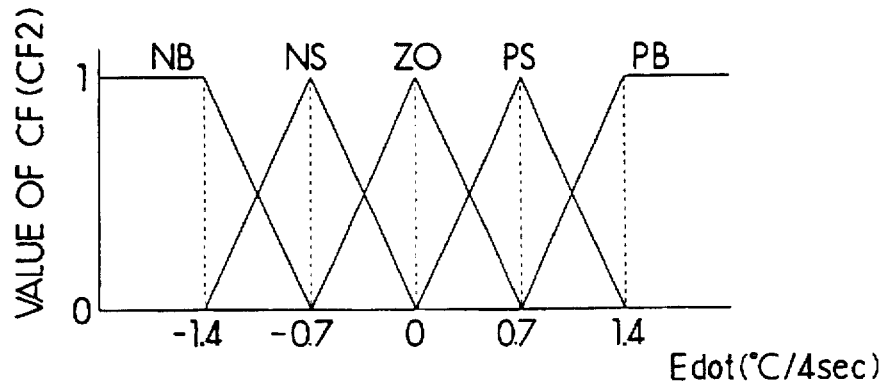
Figures 7, 8:
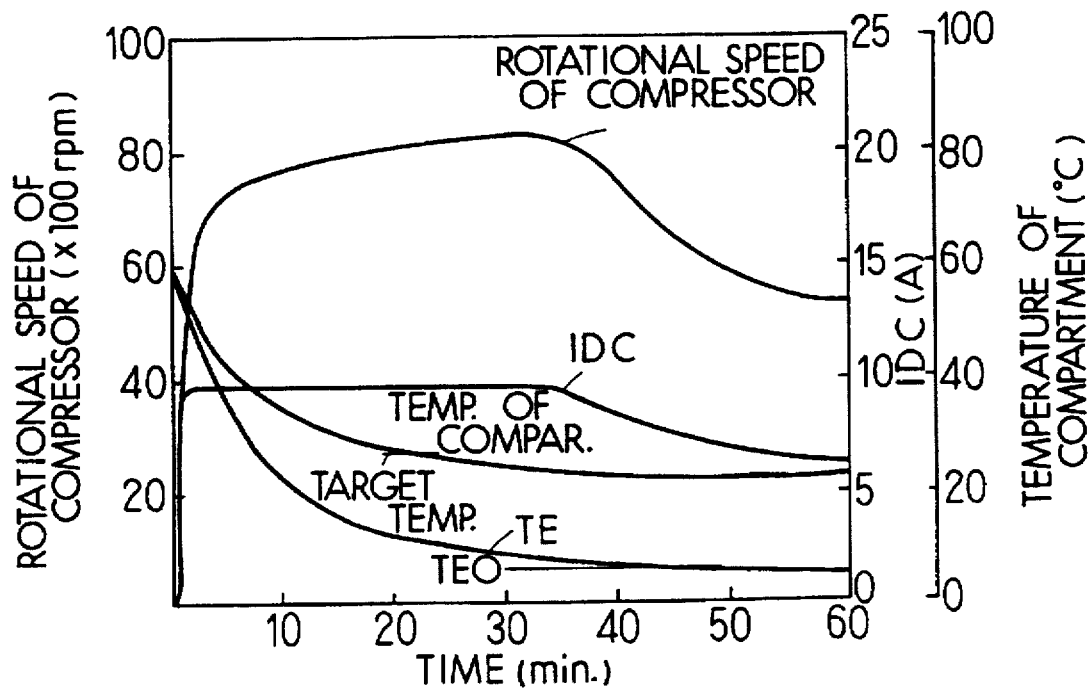
FIG. 7 is a rule table to obtain the target rotational speed of the compressor of the above first embodiment.
FIG. 8 is a graph showing a change of each controlled amount with elapse of time in the above first embodiment.

At the next step 180, based on a membership function of FIG. 6 and a rule of FIG. 7 stored in ROM, target increasing rotational speed Δf (rpm) in En and Edot calculated at the above steps 160 and 170 is calculated. In this case, the target increasing rotational speed Δf is a rotational speed of the compressor 21 which is increased or decreased from the previous target rotational speed fn−1 (rpm) at four seconds before.

Specifically, input compatibility CF is obtained based on the following equation 4 from CF1 obtained by FIG. 6A and CF2 obtained by FIG. 6B. Furthermore, Δf is calculated based on the following equation 5 from this input compatibility CF and a rule value of FIG. 7.

$$CF=CF1 \times CF2 \tag{4}$$

$$\Delta f = \Sigma(CF \times \text{rule value})/\Sigma CF \tag{5}$$

At the next step 190, the target rotational speed fn of the compressor 21 is calculated based on the following equation (6).

$$fn=fn-1+\Delta f \tag{6}$$

Then, at the next step 200, electric current input to the inverter 31 is controlled in such a manner that the rotational speed of the compressor detected by the compressor rotational speed sensor 42 is set to the above target rotational speed fn or less. By supplying electricity to control the inverter 31 in this way, actual air temperature immediately after passing through the indoor cooling heat exchanger 11 can be closer to the above target temperature TEO. After that, the Microcomputer returns to the step 120.

For example, if En=−2.5 (°C.) and Edot=−0.35 (°C./4 sec.), NB=0, NS=0.5, ZO=0.5, PS=0, PB=0 according to FIG. 6A and NB=0, NS=0.5, ZO=0.5, PS=0, PB=0 according to FIG. 6B.

Therefore, the denominator ΣCF of the above equation (5) is 0.5×0.5+0.5×0.5×0.5×0.5+0.5×0.5=1, and the numerator Σ (CF×rule value) of the above equation (5) is 0.5×0.5×80+ 0.5×0.5×100+0.5×0.5×150+0.5×0.5×0=82.5. Consequently, Δf=82.5. Thus, the rotational speed of the compressor fn is increased only by 82.5 (rpm) from the previous rotational speed fn−1 at four seconds before.

In the blank columns in the rule table of FIG. 7, the above equations (4) and (5) are not calculated. Moreover, when ΣCF=0, Δf=0.

When the determination is NO at the above step 140, that is, when consumed electric power of the compressor is more than the above predetermined electric power, the step 190 is performed after the Microcomputer jumps to the step 210 to set Δf to 0. Thus, since the target rotational speed of the compressor 21 is fixed to the previous rotational speed fn−1 at four seconds before, IDC is also fixed to the first predetermined value a1.

On the other hand, when it is determined that the cooler switch 55a is not turned on at the step 130, it is determined whether the heater switch 55b is turned on or not at the step 220. When the determination is ON, it is determined whether supplied electric current IDC supplied to the inverter 31 detected by the electric current sensor 43 is less than a second predetermined value a2 (<the first predetermined value a1, 7 A in the present embodiment) or not at the step 230. At the step 230, it is also determined whether the consumed electric power of the compressor is less than the predetermined electric power or not.

In this case, when it is determined that the IDC is less than the second predetermined value a2, target high pressure PCO at the discharge side of the compressor 21 is determined according to the position of the temperature setting lever 56 at the step 240. And at the next step 250, the deviation Dn between the above target high pressure PCO and actual high pressure PC detected by the high pressure sensor 44 is calculated based on the following equation (7).

$$Dn=PCO-PC \tag{7}$$

At the next step 260, deviation changing rate Ddot is calculated based on the following equation 8.

$$Ddot=Dn-Dn-1 \tag{8}$$

Since the above Dn is renewed every four seconds, Dn−1 is the previous value of Dn at four seconds before.

At the next step 270, the target increasing rotational speed Δf (rpm) in Dn and Ddot calculated at the above steps 250 and 260 based on the membership function and the rule (not shown) stored in ROM is calculated. Then, the microcomputer jumps to the step 190.

Moreover, when the determination is NO at the step 230, that is, when consumed electric power of the compressor is more than the above predetermined electric power, the step 190 is performed after the microcomputer jumps to the step 280 to set Δf to 0. Thus, since the target rotational speed of the compressor 21 is fixed to the previous rotational speed fn−1 at four seconds before, IDC is also fixed to the second predetermined value a2.

When it is determined that the heater switch 55b is not turned on at the step 220, the operation of the compressor 21 is stopped at the step 290 to set the blow mode to a ventilation mode.

Figure 4:
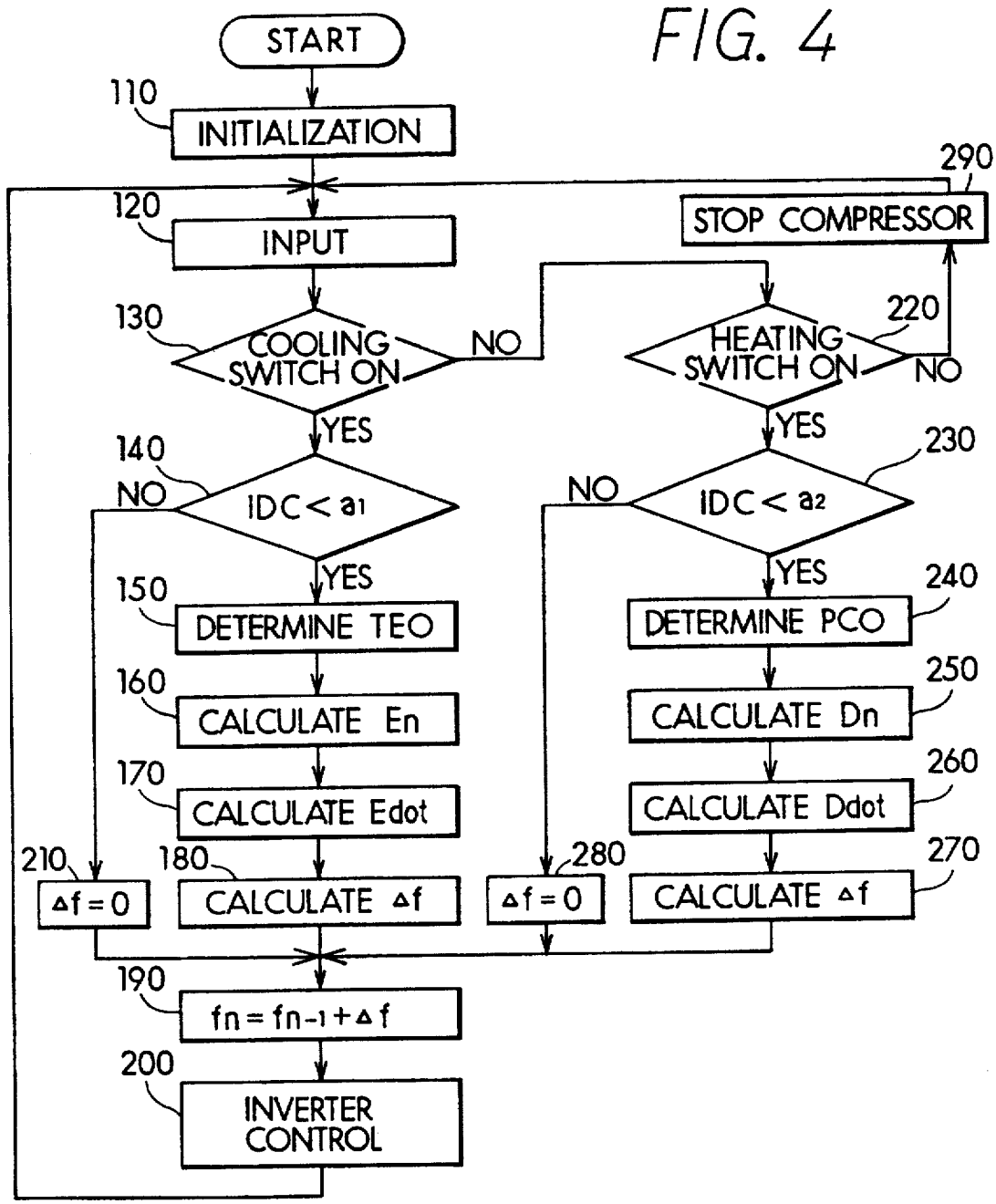
FIG. 4 is a flow chart showing processing procedures of a control of an inverter in the above first embodiment.

Furthermore, the microcomputer of the present embodiment also executes control processes on the motor 10, the four-way valve 26, the electromagnetic valve 28, and the exterior fan 29 based on a program (not shown) in addition to the control process of FIG. 4 described as the above.

By the way, when the key switch as well as the cooler switch 55a are turned on in a state that the temperature of the passenger compartment is very high and air amount setting lever 53 is placed at a position other than "OFF", the refrigerating cycle 20 is set to the cooling operation mode to start cooldown control. At this time, the rotational speed of the compressor 21, the supplied electric current IDC supplied to the inverter 31, the temperature of the passenger compartment, and the air temperature TE immediately after passing the indoor cooling heat exchanger 11 vary as shown in FIG. 8 with the elapse of time.

Figure 9:
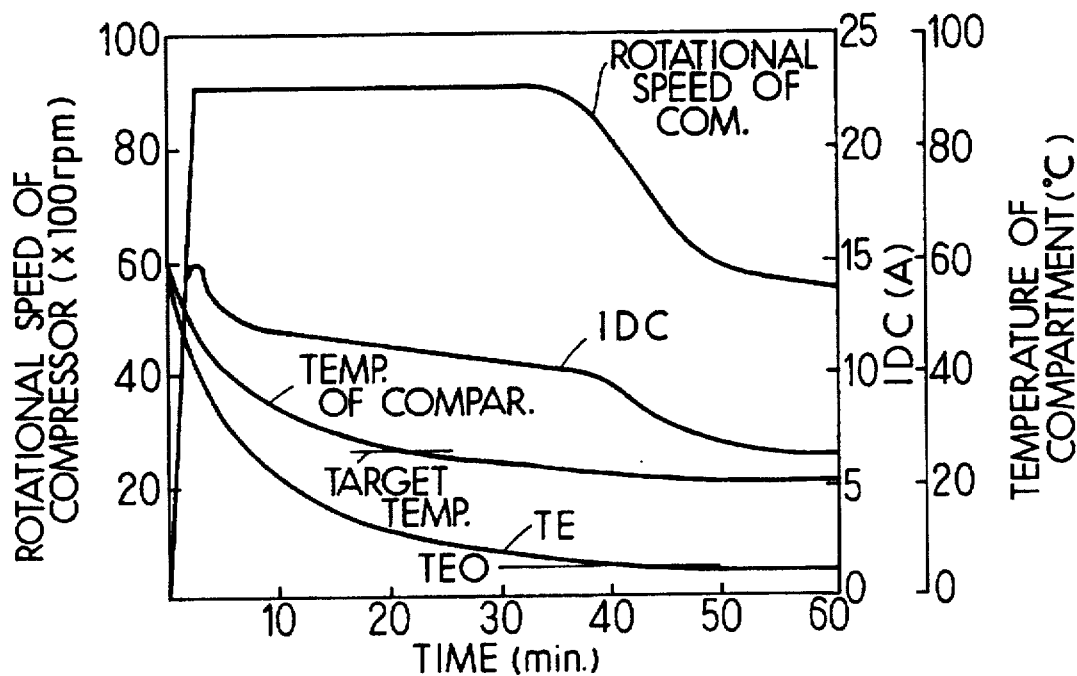
FIG. 9 is a graph showing a change of each controlled amount with elapse of time in a conventional embodiment.

On the other hand, when the cool-down control is performed in the a conventional controlling method in which no steps 140 and 210 of FIG. 4 are performed, the above rotational speed of the compressor, IDC, the temperature of the passenger compartment and TE vary as shown in FIG. 9 with the elapse of time. By the way, the respective target temperature of the passenger compartment specified in FIGS. 8 and 9 is determined by the position of the temperature setting lever 56.

Figure 10:
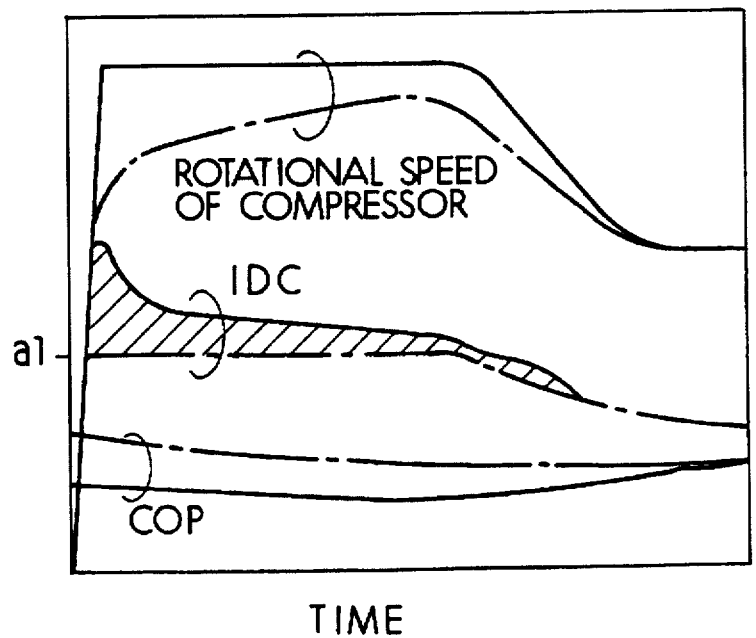
FIG. 10 is a graph overlapping a portion of FIG. 8 and FIG. 9.

Here, the rotational speed of the compressor and IDC of FIG. 8 are shown in a one-dotted line in FIG. 10 and the rotational speed of the compressor and IDC of FIG. 9 are shown in a solid line to describe the difference between FIG. 8 and FIG. 9. Also in FIG. 10, COP of the refrigerating cycle 20 in the control of the present embodiment is shown in a one-dot line and the above COP in a conventional control is shown in a solid line, respectively.

As can be understood from FIGS. 8 to 10, in the conventional control, when the deviation (=En) between TEO and TE is large at the initial time of cool-down control, since the target rotational speed fn is determined according to the magnitude of this deviation En and the supplied electric current IDC to the inverter 31 is controlled in accordance with the target rotational speed fn, the IDC exceeds the first predetermined value a1 and the consumed electric power of the compressor also exceeds the predetermined electric power. As a result, the COP becomes smaller.

In this embodiment, even if the above deviation En is large and the target rotational speed fn is high, since the electric current IDC input to the inverter 31 is always monitored to restrict the IDC not to exceed the first predetermined value a1, the IDC can be saved by the amount shown in the shaded portion in the figure, and furthermore consumed electric power of the compressor can be also saved. As a result, the COP can be larger than that of the conventional control.

Here, the consumed electric power of the compressor in this embodiment is less than that of the conventional control. However, as can be understood from FIGS. 8 and 9, there is almost no difference between the conventional control and that of the embodiment in terms of the time when the temperature of the passenger compartment reaches the target temperature. That is, in view of cooling capacity, it is possible to obtain a predetermined cooling capacity by the control of the embodiment.

In case of a warm-up control although it is not shown in a figure, IDC can be saved in the control of the present embodiment compared with a conventional control, which contributes to saving consumed electric power of the compressor. As a result, COP can be larger. A predetermined heating capacity can be also obtained in this case.

A second embodiment of the present invention is described.

In this embodiment, in view of an inside air circulation mode where the inside/outside air switching damper 7 opens the inside air inlet 5 and closes the outside air inlet 6 in the cooling operation, the following configuration is employed. Only different portions of the configuration of the present embodiment from that of the first embodiment are described below.

Figure 11:
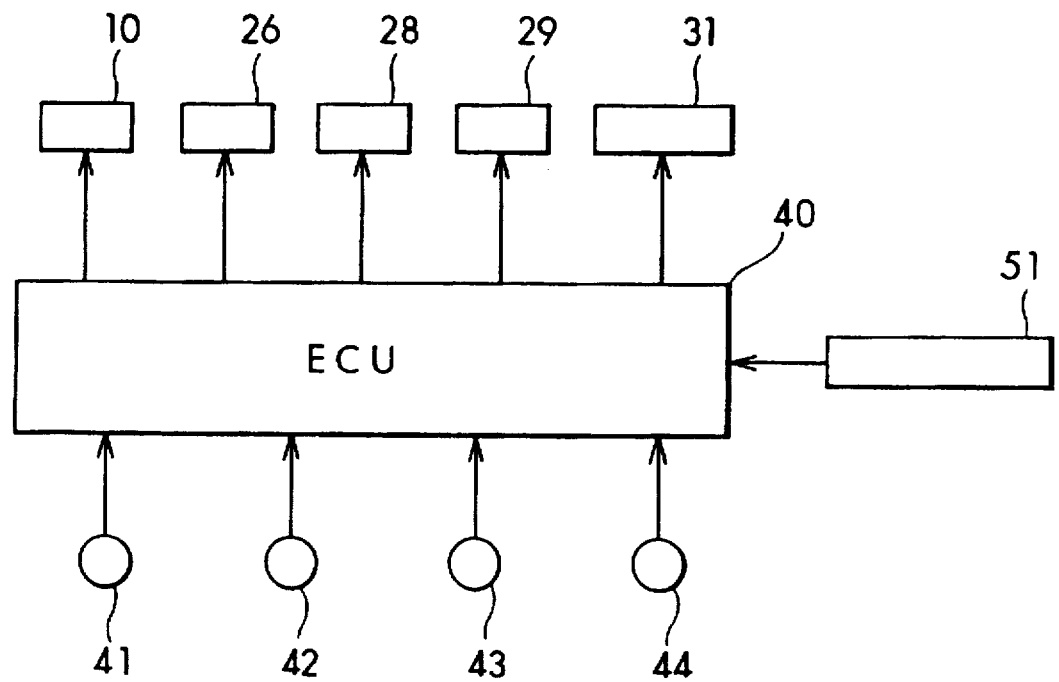
FIG. 11 is a block diagram of a control system of a second embodiment of the present invention.
Figure 15:
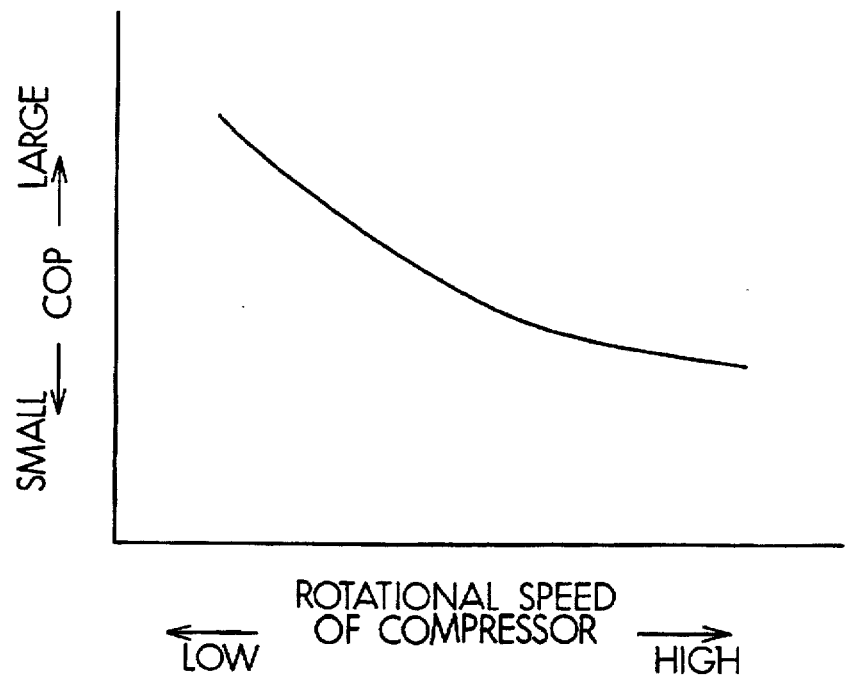
FIG. 15 is a graph showing the relation between consumed electric power of a compressor and COP of a refrigerant cycle.

First, in the air conditioning duct 2 at the suction side of the indoor cooling heat exchanger 11, a suction temperature sensor 45 for detecting air temperature at this suction side is disposed in the present embodiment. As shown in FIG. 11, a signal from this suction temperature sensor 45 is also input to the ECU 40.

Figure 12:
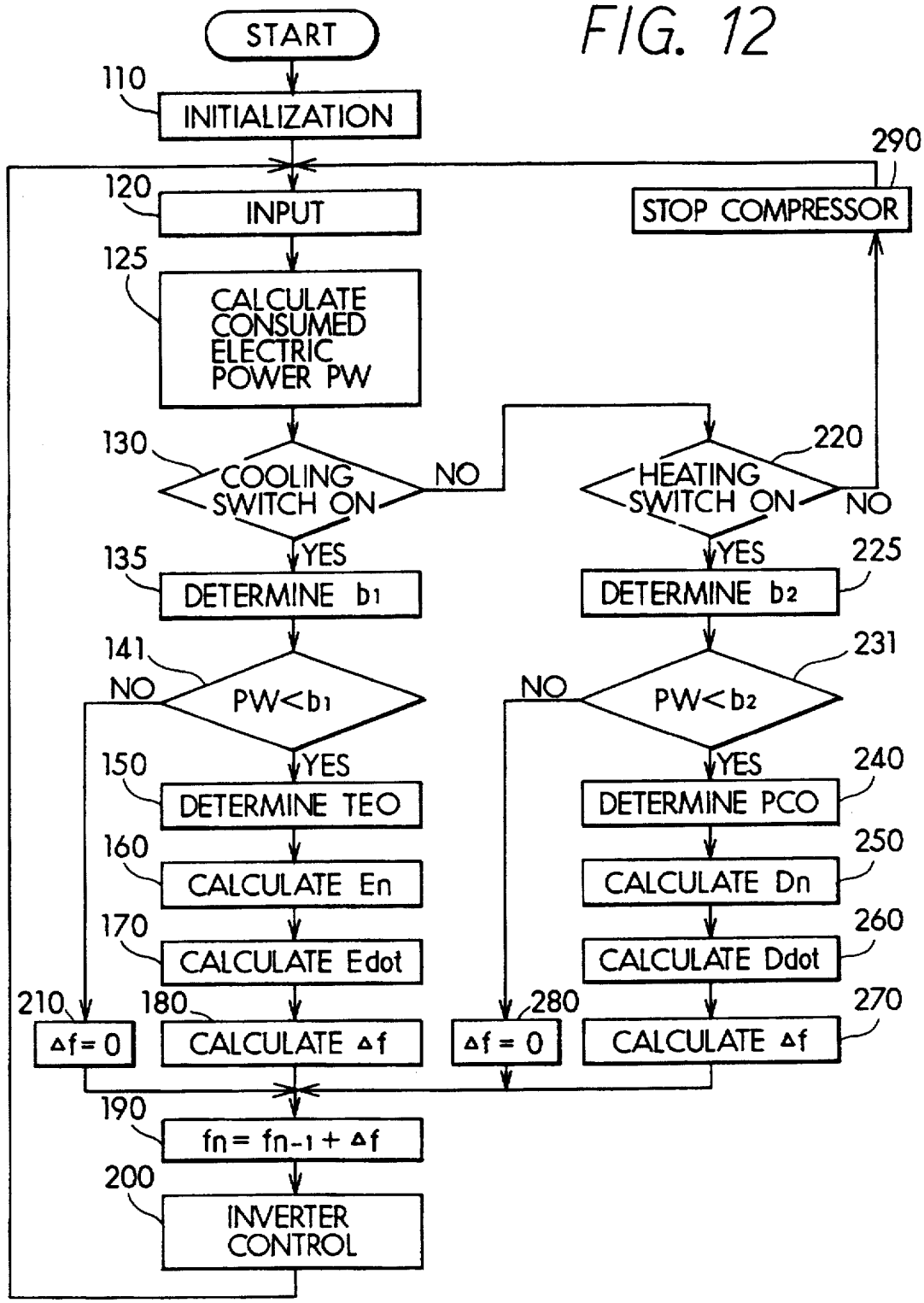
FIG. 12 is a flow chart showing processing procedures of a control of an inverter in the above second embodiment.

Next, the control process of the inverter 31 by the microcomputer in the present embodiment is described with reference to FIG. 12. In FIG. 12, the same reference numerals are used for the same or equivalent steps as in the first embodiment.

Firstly, each initialization and primary setting are performed at the step 110 and signals from the above respective sensors 41 to 45 as well as signals from each lever and switch of the control panel 51 are input. Then, at the step 125, the consumed electric power PW of the compressor is calculated from the above equation (1) based on the detected value IDC of the electric current sensor 43 input at the above step 120.

Then, it is determined whether the cooler switch 55a is turned on or not at the next step 130. When the determination is ON, a first predetermined value b1 used at the step 141 described below is determined at the step 135.

Here, a method for determining the above first predetermined value b1 at this step 135 is described.

Figure 13:
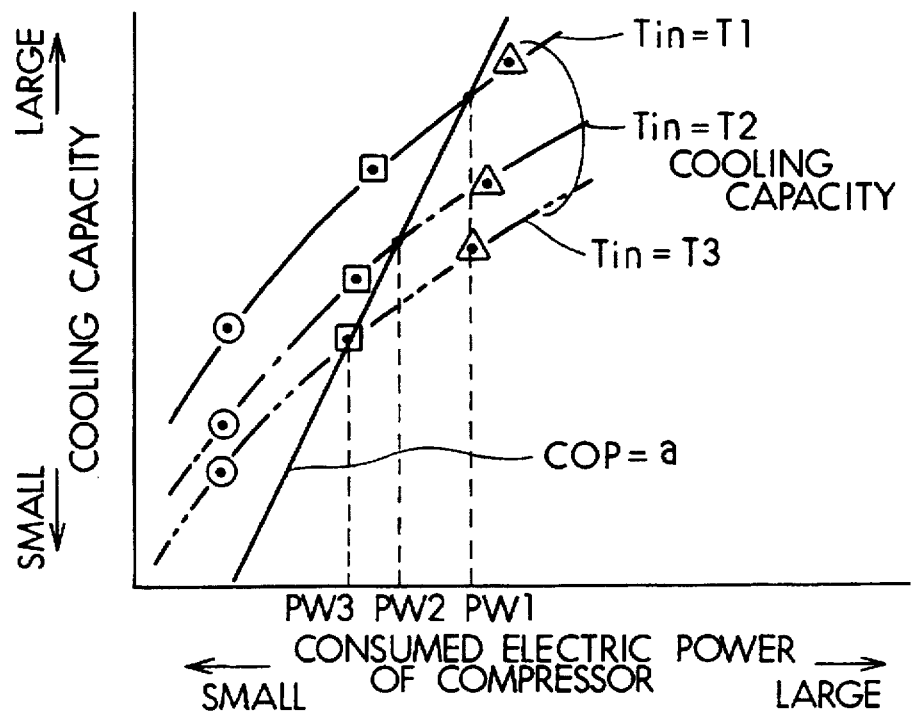
FIG. 13 is a map used to determine a predetermined value b1 at a step 135 of FIG. 12.

The relation between the consumed electric power PW of the compressor and cooling capacity in the inside air circulation mode is as shown in a curved line of FIG. 13. This relation varies based on air temperature Tin at the suction side of the indoor cooling heat exchanger 11. For example, when Tin=T1, it varies as shown in a solid line in the figure, when Tin=T2, it changes as shown in a one-dot line in the figure, and when Tin=T3, it varies as shown in a two-dot line in the figure (T1>T2>T3). The straight line in FIG. 13 means that COP of the refrigerating cycle 20 is a predetermined high value α.

Therefore, in this embodiment, the relation in FIG. 13 is stored in ROM. The consumed electric power PW of the compressor obtained at the crossing point between the above curved line determined by the detected value Tin of the suction temperature sensor 45 input at the step 120 and the above straight line of COP=α is determined as the above b1. For example, when Tin=T1, b1=PW1, when Tin=T2, b1=PW2, and when Tin=T3, b1=PW3.

At the step 141, it is determined whether the consumed electric power PW of the compressor calculated at the above step 125 is less than the first predetermined value b1 or not. When the determination is "less", it means that COP is larger than the above α. Therefore, the steps after the step 150 are performed. Conversely, when the determination is "more", it means that the COP is equal to the above α or more. Therefore, by performing the steps after the step 210, the consumed electric power of the compressor is restricted to the first predetermined value b1 or less to maintain COP to α.

Furthermore, when the heater switch 220 is turned on, a second predetermined value b2 to be used at the step 231 described later is determined at the step 225. A method for determining this second predetermined value b2 adopts the same idea as in the method of determining the above first predetermined value b1, and the second predetermined value b2 is determined based on the relationship (stored in ROM) where the vertical line of FIG. 13 is replaced to heating capacity. In the heating operation, according to the relationship where the above vertical line is replaced to heating capacity, the relation of suction air temperature Tin is T1<T2<T3 in the inside air circulation mode. On the other hand, in the outside air introducing mode, Tin is fixed to a predetermined value (for example T1).

At the next step 231, it is determined whether consumed electric power PW of the compressor calculated at the above step 125 is less than the second predetermined value b2 or not. When the determination is "less", the steps after the step 240 are performed. Conversely, when the determination is "more", by performing the steps after the step 280, the consumed electric power of the compressor is restricted to the second predetermined value b2 or less to maintain COP to α.

In the second embodiment, since the consumed electric power PW of the compressor where COP=α is calculated as the predetermined values b1 and b2, so that COP of the refrigerating cycle 20 can be always α to control the consumed electric power of the compressor, the refrigerating cycle 20 can be efficiently operated.

Besides, it is needless to say that predetermined cooling and heating capacities can be also obtained in the present embodiment.

Moreover, in the present embodiment, since the above predetermined values b1 and b2 are obtained according to the suction temperature Tin, the refrigerating cycle 20 can be more efficiently operated.

Next, a third embodiment of the present invention is described.

Similarly to the second embodiment, in the third embodiment, in view of the inside air circulation mode in the cooling operation. Only portions of the configuration of the third embodiment different from the above first and second embodiments are described below.

First, similarly to the above second embodiment, in the air conditioning duct 2 at the suction side of the indoor cooling heat exchanger 11, a suction temperature sensor 45 for detecting air temperature at this suction side is disposed in this embodiment. As shown in FIG. 11, a signal from this suction temperature sensor 45 is also input to the ECU 40.

Also, the control process of the inverter 31 by the microcomputers in this embodiment is as shown in FIG. 12 in the same manner as in the second embodiment, however, in this embodiment, a method for determining the predetermined values b1 and b2 at the steps 135 and 225 are different. Only a method for determining the first predetermined value b1 is described later with reference to FIG. 14. An explanation of a method for determining the second predetermined value b2 is omitted.

Figure 14:
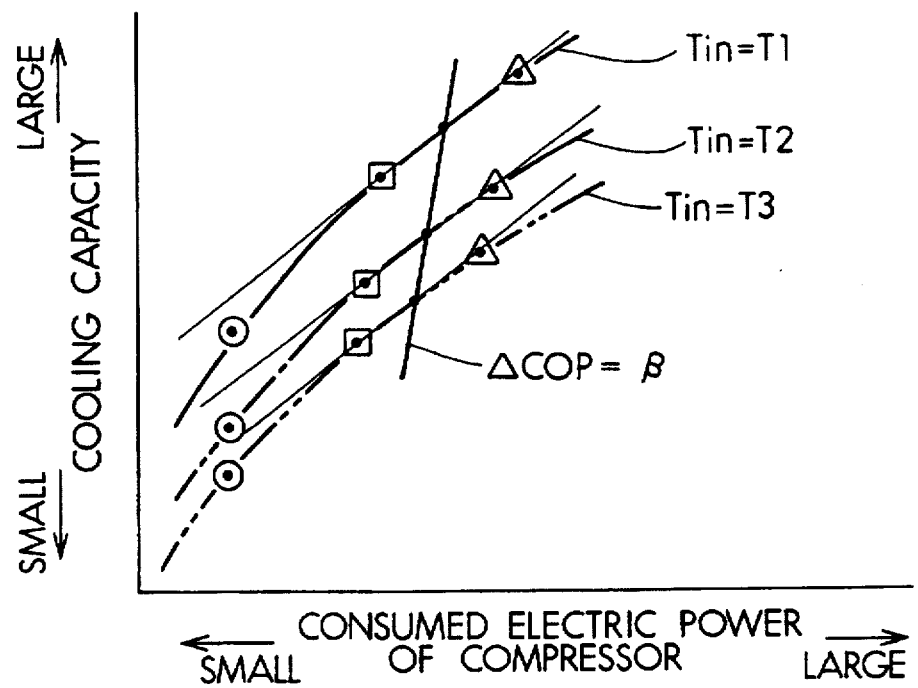
FIG. 14 is a map used to determine the above predetermined value b1 of a third embodiment of the present invention.

Although a curved line of FIG. 14 is the same as of FIG. 13, a straight line of FIG. 14 is difference from FIG. 13. The straight line of this FIG. 14 means that changing rate $\Delta COP$ of COP of the refrigerating cycle 20 (=changing amount of cooling capacity/changing amount of PW. A tangent line on each curved line of FIG. 14) is a predetermined high value $\beta$.

Therefore, in this embodiment, the relation of FIG. 14 is stored in ROM, and the consumed electric power PW of the compressor obtained at the crossing point between the above curved line determined by the detected value Tin of the suction temperature sensor 45 input at the step 120 and the above straight line of $\Delta COP=\beta$ is determined as the above b1.

In this embodiment, in which the predetermined values b1 and b2 are determined and the inverter 31 is controlled based on these b1 and b2, the consumed electric power PW of the compressor where COP=D is calculated as the predetermined values b1 and b2, so that $\Delta COP$ of the refrigerating cycle 20 can be always $\beta$ to control the consumed electric power of the compressor. Accordingly, the refrigerating cycle 20 can be efficiently operated.

Besides, it is needless to say that predetermined cooling and heating capacities more than predetermined capacities can be also obtained in the present embodiment.

Moreover, in this embodiment, since the above predetermined values b1 and b2 are obtained according to the suction temperature Tin, the refrigerating cycle 20 can be more efficiently operated.

Figure 16A:
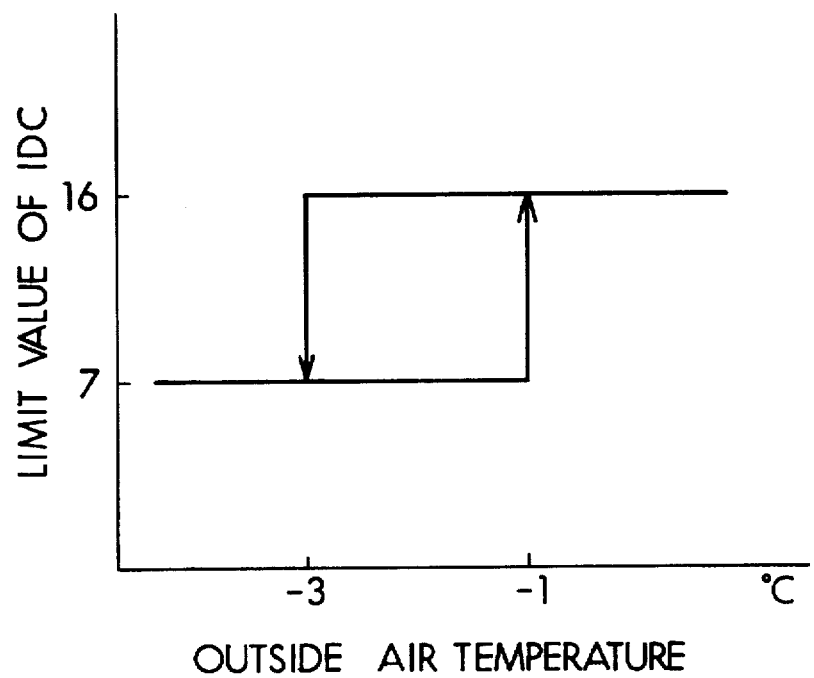
FIGS. 16A and 16B are graphs showing the relation between the temperature of the outside air and the limit value of the supplied electric current IDC.
Figure 16B:
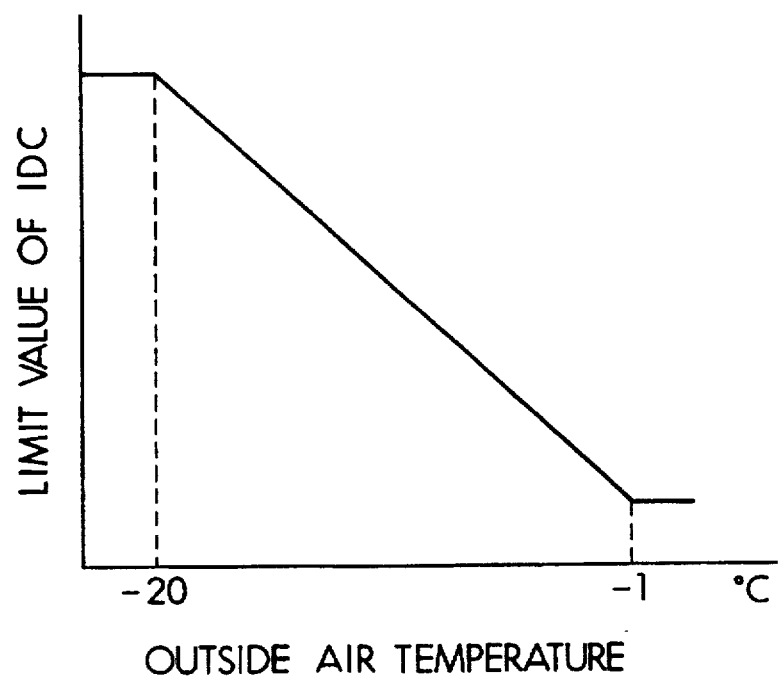

In each embodiment, the limit value of the supplied electric current IDC supplied to the inverter 31 may be altered according to the outside air temperature. For example, as shown in FIG. 16A, when the temperature of the outside air becomes $-3$ (°C.), the limit value of the supplied electric current IDC supplied to the inverter 31 is altered from 7 to 16 (A), and when the temperature of the outside air becomes $-1$ (°C.) again, the limit value of the supplied electric current IDC supplied to the inverter 31 is altered from 16 to 7 (A). Further, as shown In FIG. 16B, the limit value of the supplied electric current IDC supplied to the inverter 31 may be altered in proportion to the temperature of the outside air.

Although the present invention is applied to an air conditioning apparatus for electric vehicles in each embodiment, the present invention can be applied to, for example, an air conditioning apparatus for a room in a house or building.

Furthermore, in each embodiment, an electric motor is used, however, it is not limited to, a driving means driven by energy sources other than electric energy may be used. In this case, almost the same effect as in the above each embodiment can be also obtained.

In addition, a humidity sensor may be disposed in the above second and third embodiments, so that the relation in FIGS. 13 and 14 (for example, a solid line, a one-dotted line, and a two-dotted line in the figures) may be altered according to a value of the suction temperature sensor 45 and a value of this humidity sensor. In this case, the above relation can be more accurately set.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air conditioning apparatus comprising:
   a refrigerating cycle equipped with a compressor for sucking, compressing, and discharging refrigerant, a condenser for condensing the refrigerant from said compressor, a pressure reducing means for reducing pressure of the refrigerant from said condenser, and an evaporator for evaporating the refrigerant from said pressure reducing means;
   driving means for driving said compressor;
   an air conditioning unit for forming an air passage leading to a compartment, at least one of said evaporator or said condenser being disposed in said air passage;
   air blowing means for blowing air in said air passage;
   temperature setting means for setting target temperature in said compartment;
   target rotational speed determining means for determining target rotational speed of said compressor according to said target temperature and actual air conditioning load of said refrigerating cycle;
   driving control means controlling said driving means in such a manner that an actual rotational speed of said compressor is set to said target rotational speed
   means for obtaining a physical value relative to consumed power of said driving means;
   determining means for determining whether said physical value is larger or smaller than a predetermine value;
   wherein said target rotational speed determining means determines a rotational speed of said compressor in such a manner that said actual physical value is set to be no more than said predetermined value when said obtained physical value is larger than said predetermined value;
   suction temperature detecting means for detecting air temperature at a suction side of said evaporator or said condenser disposed in said air passage; and
   predetermined value determining means for determining said predetermined value based on said air temperature detected by said suction temperature detecting means.

2. An air conditioning apparatus according to claim 1 wherein said driving means is an electric motor; and
   said physical value is relative to consumed electric power of said electric motor.

3. An air conditioning apparatus according to claim 2, wherein said physical value is an electric current amount supplied to said electric motor.

4. An air conditioning apparatus according to claim 2, wherein said physical value is obtained by calculating a consumed electric power of said electric motor.

5. An air conditioning apparatus according to claim 1, wherein said predetermined value determining means determines said predetermined value in such a manner that coefficiency of performance of said refrigerating cycle is set to a predetermined magnitude.

6. An air conditioning apparatus according to claim 1, wherein said predetermined value determining means determines said predetermined value in such a manner that a changing rate of said coefficiency of performance of said refrigerating cycle is set to a predetermined changing rate value.

7. An air conditioning apparatus according to claim 1, wherein said predetermined value determining means determines said predetermined value in such a manner that the higher said suction temperature detected by said suction temperature detecting means is, the larger said predetermined value is.

8. An air conditioning apparatus according to claim 1, wherein said refrigerating cycle is a heat pump type refrigerating cycle; and both said evaporator and said condenser are disposed in said air passage.

9. An air conditioning apparatus according to claim 2, wherein said air conditioning apparatus is used for an electric vehicle.

10. An air conditioning apparatus according to claim 9, wherein said refrigerating cycle is a heat pump type refrigerating cycle; and both said evaporator and said condenser are disposed in said air passage.

11. An air conditioning apparatus according to claim 3, further comprising:

outside air temperature detecting means for detecting a temperature of outside air; and electric current amount limiting means for limiting said electric current supplied to said electric motor according to said outside air temperature detected by said outside air temperature detecting means.

12. An air conditioning apparatus comprising:

a casing having an air passage in which an air inlet for sucking air is formed at one end and an ir outlet for blowing out air into a compartment is formed at the other end;

a heat exchanger disposed in said air passage for heat exchanging with air in said air passage;

a compressor for compressing refrigerant so as to forming a refrigerating cycle with said heat exchanger;

driving means for driving said compressor;

air blowing means for blowing air in said air passage; and temperature setting means for setting target temperature in said compartment;

target rotational speed determining means for determining target rotational speed of said compressor according to said target temperature and actual air conditioning load of said refrigerating cycle;

driving control means controlling said driving means in such a manner that an actual rotational speed of said compressor is set to said target rotational speed, means for obtaining a physical value relative to consumed power of said driving means; and determining means for determining whether said physical value is larger or smaller than a predetermine value;

wherein said target rotational speed determining mans determines a rotational speed of said compressor in such a manner that said actual physical value is set to be no more than said predetermined value when said obtained physical value is larger than said predetermined value; and said rotational speed of said compressor is restricted in accordance with a deviation between said target temperature and actual temperature.

13. An air conditioning apparatus according to claim 12, wherein said driving means is an electric motor; and said physical value is relative to consumed electric power of said electric motor.

14. An air conditioning apparatus according to claim 13, wherein said physical value is an electric current amount supplied to said electric motor.

15. An air conditioning apparatus for an electric vehicle having a passenger compartment, said air conditioning apparatus comprising:

a casing having an air passage in which an inside air inlet for sucking inside air and an outside air inlet for sucking outside air are formed at one end and an air outlet for blowing out air into said compartment is formed at the other end;

a first heat exchanger disposed in said air passage for cooling air in said air passage;

a second heat exchanger disposed in said air passage for heating air in said air passage;

a compressor for compressing refrigerant so as to forming a refrigerating cycle with said first and second heat exchanger;

driving means for driving said compressor;

air blowing means for blowing air in said air passage; and temperature setting means for setting target temperature ins aid compartment;

target rotational speed determining means for determining target rotational speed of said compressor according to said target temperature and actual air conditioning load of said refrigerating cycle;

driving control means controlling said driving means in such a manner that an actual rotational speed of said compressor is set to said target rotational speed, means for obtaining a physical value relative to consumed power of said driving means; and determining means for determining whether said physical value is larger or smaller than a predetermined value;

wherein said target rotational speed determining means determines a rotational speed of said compressor in such a manner that said actual physical value is set to be no more than said predetermined value when said obtained physical value is larger than said predetermined value; and said rotational speed of said compressor is restricted in accordance with a deviation between said target temperature and actual temperature in said passenger compartment.

16. An air conditioning apparatus according to claim 15, wherein said driving means is an electric motor; and said physical value is relative to consumed electric power of said electric motor.

17. An air conditioning apparatus according to claim 16, wherein said physical value is an electric current amount supplied to said electric motor.

18. An air conditioning apparatus comprising:

a refrigerating cycle equipped with a compressor for sucking, compressing, and discharging refrigerant, a condenser for condensing the refrigerant from said compressor, a pressure reducing means for reducing pressure of the refrigerant from said condenser, and an evaporator for evaporating the refrigerant from said pressure reducing means;

driving means for driving said compressor;

an air conditioning unit for forming an air passage leading to a compartment, at least one of said evaporator or said condenser being disposed in said air passage;

air blowing means for blowing air in said air passage;

temperature setting means for setting target temperature in said compartment;

target rotational speed determining means for determining target rotational speed of said compressor according to said target temperature and actual air conditioning load of said refrigerating cycle;

driving control means controlling said driving means in such a manner that an actual rotational speed of said compressor is set to said target rotational speed;

means for obtaining a physical value relative to consumed power of said driving means; and determining means for determining whether said physical value is larger or smaller than a predetermined value, wherein said target rotational speed determining means determines a rotational speed of said compressor in such a manner that said actual physical value is set to be no more than said predetermined value when said obtained physical value is larger than said predetermined value, and said rotational speed of said compressor is restricted in accordance with a deviation between said target temperature and actual temperature.

19. An air conditioning apparatus according to claim 18 wherein, said driving means is an electric motor, and said physical value is relative to consumed electric power of said electric motor.

20. An air conditioning apparatus according to claim 19 wherein, said physical value is an electric current amount supplied to said electric motor.

21. An air conditioning apparatus according to claim 19 wherein, said physical value is obtained by calculating a consumed electric power of said electric motor.

22. An air conditioning apparatus according to claim 18, further comprising:

suction temperature detecting means for detecting air temperature at a suction side of said evaporator or said condenser disposed in said air passage; and predetermined value determining means for determining said predetermined value based on said suction temperature detected by said suction temperature detecting means.

23. An air conditioning apparatus according to claim 22 wherein, said predetermined value determining means determines said predetermined value in such a manner that coefficiency of performance of said refrigerating cycle is set to a predetermined magnitude.

24. An air conditioning apparatus according to claim 23 wherein, said predetermined value determining means determines said predetermined value in such a manner that a changing rate of said coefficiency of performance of said refrigerating cycle is set to a predetermined changing rate value.

25. An air conditioning apparatus according to claim 22 wherein, said predetermined value determining means determines said predetermined value in such a manner that the higher said suction temperature detected by said suction temperature detecting means is, the larger said predetermined value is.

26. An air conditioning apparatus according to claim 18 wherein, said refrigerating cycle is a heat pump type refrigerating cycle; and both said evaporator and said condenser are disposed in said air passage.

27. An air conditioning apparatus according to claim 19 wherein, said air conditioning apparatus is used for an electric vehicle.

28. An air conditioning apparatus according to claim 27 wherein, said refrigerating cycle is a heat pump type refrigerating cycle; and both said evaporator and said condenser are disposed in said air passage.

29. An air conditioning apparatus according to claim 20, further comprising:

outside air temperature detecting means for detecting a temperature of outside air; and electric current amount limiting means for limiting said electric current supplied to said electric motor according to said outside air temperature detected by said outside air temperature detecting means.

30. An air conditioning apparatus according to claim 18, said rotational speed of said compressor is not increases when said deviation between said target temperature and said actual temperature is larger than a predetermined value.

* * * * *

UNITED STATES PATENT AND TRADEMARK OFFICE
CERTIFICATE OF CORRECTION

PATENT NO. : 5,709,098
DATED : January 20, 1998
INVENTOR(S) : Satoshi Itoh et al It is certified that error appears in the above-identified patent and that said Letters Patent is hereby corrected as shown below:

Col. 1, line 55, delete "necessity" and substitute --necessary-- therefor

Col. 3, line 20, after "saved," insert --and,--

Col. 4, line 14, after "to" insert --the--

Col. 5, line 50, delete "(now" and substitute --(not-- therefor

Col. 5, line 51, delete "These" and substitute --This-- therefor

Col. 8, line 4, delete "8" and substitute --(8)-- therefor

Col. 8, line 44, delete "the"

Col. 8, line 67, "al" should be --a1--

Col. 10, line 63, after "operation" insert -- , the following configuration is employed --

Col. 11, line 15, delete "difference" and substitute --different-- therefor

Col. 11, line 18, delete "PW" and substitute --PW)-- therefor

Col. 11, line 19, delete "FIG.14)" and substitute --FIG. 14-- therefor

Col. 11, line 31, "COP = D" should be --COP = $\beta$--

Col. 11, line 52, delete "In" and substitute --in-- therefor

UNITED STATES PATENT AND TRADEMARK OFFICE
CERTIFICATE OF CORRECTION

PATENT NO. : 5,709,098
DATED : January 20, 1998
INVENTOR(S) : Satoshi Itoh et al It is certified that error appears in the above-identified patent and that said Letters Patent is hereby corrected as shown below:

Col. 11, line 62, delete "to, a" and substitute --to such use.  A-- therefor

Col. 12, line 35, claim 1, "speed" should be --speed;--

Col. 12, line 40, claim 1, delete "predetermine" and substitute --predetermined-- therefor Col. 13, line 36, claim 12, delete "ir" and substitute --air-- therefor--

Col. 13, line 58, claim 12, delete "predetermine" and substitute --predetermined--

Col. 13, line 59, claim 12, delete "mans" and substitute --means-- therefor

Col. 14, line 26, claim 15, delete "ins aid" and substitute --in said-- therefor Col. 16, line 40, claim 30, delete "increases" and substitute --increased-- therefor Signed and Sealed this Twenty-fourth Day of November, 1998

Attest:

BRUCE LEHMAN

Attesting Officer     Commissioner of Patents and Trademarks